United States Patent
Duce et al.

(10) Patent No.: US 10,356,847 B2
(45) Date of Patent: Jul. 16, 2019

(54) COMPOSITE PANEL WITH INTEGRATED HEATER SYSTEM AND ASSOCIATED METHODS FOR MANUFACTURING

(71) Applicant: The Boeing Company, Chicago, IL (US)

(72) Inventors: Jeffrey L. Duce, Maple Valley, WA (US); Marcus K. Richardson, Bothell, WA (US); Myles E. Brown, Bothell, WA (US)

(73) Assignee: The Boeing Company, Chicago, IL (US)

( * ) Notice: Subject to any disclaimer, the term of this patent is extended or adjusted under 35 U.S.C. 154(b) by 331 days.

(21) Appl. No.: 15/069,800

(22) Filed: Mar. 14, 2016

(65) Prior Publication Data
US 2016/0270153 A1   Sep. 15, 2016

Related U.S. Application Data

(63) Continuation-in-part of application No. 14/656,220, filed on Mar. 12, 2015, now Pat. No. 9,736,888.

(51) Int. Cl.
*H05B 1/02* (2006.01)
*H05B 3/36* (2006.01)
(Continued)

(52) U.S. Cl.
CPC ......... *H05B 1/0238* (2013.01); *F24D 13/022* (2013.01); *F24H 9/1872* (2013.01);
(Continued)

(58) Field of Classification Search
CPC ...... H05B 1/0238; H05B 1/0202; H05B 3/20; H05B 3/36; H05B 2203/013;
(Continued)

(56) References Cited

U.S. PATENT DOCUMENTS

| 4,284,443 A | 8/1981 | Hilton |
| 5,408,069 A | 4/1995 | Mischel, Jr. |

(Continued)

FOREIGN PATENT DOCUMENTS

| DE | 102008058529 A1 | 5/2010 |
| EP | 2716981 A1 | 4/2014 |

OTHER PUBLICATIONS

Extended European Search Report for European Patent Application No. 16159893.3 dated Jul. 20, 2016.
(Continued)

*Primary Examiner* — Shawntina T Fuqua
(74) *Attorney, Agent, or Firm* — Kunzler Bean & Adamson

(57) ABSTRACT

Described herein is a composite panel that includes a first layer made from an electrically non-conductive material. The composite panel also includes a resistance heater printed onto the first layer and a capacitive sensor applied onto the first layer. The capacitive sensor is operably coupled with the resistance heater. The composite panel additionally includes a second layer adjacent the resistance heater and the capacitive sensor. The resistance heater and the capacitive sensor are positioned between the first layer and the second layer. Furthermore, the second layer is made from an electrically non-conductive material. The resistance heater is configured to generate heat at least partially in response to input sensed by the capacitive sensor.

20 Claims, 8 Drawing Sheets

(51) Int. Cl.
*F24H 9/18* (2006.01)
*F24D 13/02* (2006.01)
*H05B 3/20* (2006.01)

(52) U.S. Cl.
CPC .............. *H05B 1/0202* (2013.01); *H05B 3/20* (2013.01); *H05B 3/36* (2013.01); *F24D 2200/08* (2013.01); *F24D 2220/2081* (2013.01); *H05B 2203/013* (2013.01); *H05B 2203/016* (2013.01); *H05B 2203/017* (2013.01); *H05B 2203/02* (2013.01); *Y02B 30/26* (2013.01)

(58) Field of Classification Search
CPC ........ H05B 2203/016; H05B 2203/017; H05B 2203/02; F24D 13/022; F24D 2200/08; F24D 2220/2081; F24H 9/1872; Y02B 30/26
See application file for complete search history.

(56) References Cited

U.S. PATENT DOCUMENTS

| | | |
|---|---|---|
| 5,565,124 A | 10/1996 | Balzano |
| 8,575,523 B2 | 11/2013 | Chivers et al. |
| 9,161,393 B2 | 10/2015 | Kaiserman et al. |
| 2002/0027133 A1 | 3/2002 | Kellogg et al. |
| 2002/0043525 A1 | 4/2002 | Laken et al. |
| 2004/0100131 A1* | 5/2004 | Howick ............... B60N 2/5678 297/180.12 |
| 2004/0155020 A1 | 8/2004 | Worrell et al. |
| 2010/0065542 A1 | 3/2010 | Dubey |
| 2011/0226751 A1 | 9/2011 | Lazanja et al. |
| 2014/0339211 A1* | 11/2014 | Barfuss .................. B60N 2/002 219/202 |
| 2015/0156819 A1* | 6/2015 | Kielar ...................... H05B 3/20 219/509 |
| 2016/0270152 A1 | 9/2016 | Duce et al. |

OTHER PUBLICATIONS

Notice of Allowance for U.S. Appl. No. 14/656,220 dated Apr. 27, 2016.

European Search Report for EP Application No. 17158714.0 dated Jul. 17, 2017.

European Examination Report for EP Application No. 17158714.0 dated Sep. 25, 2018.

* cited by examiner

COMPOSITE PANEL WITH INTEGRATED HEATER SYSTEM AND ASSOCIATED METHODS FOR MANUFACTURING

FIELD

This disclosure relates generally to components for vehicles, and more particularly to a composite panel with an integrated heater system for use in vehicles.

BACKGROUND

Conventional resistance heaters used in vehicles include protection circuits and devices to prevent overheating and failures. Many resistance heaters are preformed, stand-alone heaters made from materials and processes that render the heaters less conducive to post-manufacturing integration into components for vehicles. For example, some conventional heaters are made from inflexible and heat intolerant materials.

Conventional composite panels, particularly those with non-planar shapes, do not include integrated heaters. Moreover, conventional resistance heaters are expensive and not conducive to integrating into or co-forming with composite or multi-ply panels. Furthermore, some temperature regulation and protection systems associated with conventional resistance heaters add too much to the weight, complexity, and cost of the heaters.

SUMMARY

The subject matter of the present application provides embodiments of composite panels with integrated heater systems, and associated methods for manufacturing, that overcome the above-discussed shortcomings of prior art techniques. The subject matter of the present application has been developed in response to the present state of the art, and in particular, in response to shortcomings of conventional composite panels for vehicles and conventional resistance heaters.

According to one embodiment, a composite panel includes a first layer made from an electrically non-conductive material. The composite panel also includes a resistance heater printed onto the first layer and a capacitive sensor applied onto the first layer. The capacitive sensor is operably coupled with the resistance heater. The composite panel additionally includes a second layer adjacent the resistance heater and the capacitive sensor. The resistance heater and the capacitive sensor are positioned between the first layer and the second layer. Furthermore, the second layer is made from an electrically non-conductive material. The resistance heater is configured to generate heat at least partially in response to input sensed by the capacitive sensor.

In some implementations of the composite panel, the resistance heater includes a first ink layer printed onto the first layer and a second ink layer printed onto the first ink layer. The first ink layer is made from a first ink and the second ink layer is made from a second ink different than the first ink. The first ink can be an electrically conductive ink and the second ink can be a switching-type positive temperature coefficient ink.

According to certain implementations of the composite panel, the first layer, resistance heater, capacitive sensor, and second layer together form a sandwich panel. The sandwich panel has a non-planar shape.

In certain implementations of the composite panel, the first layer, resistance heater, capacitive sensor, and second layer are flexible.

According to yet some implementations, the composite panel further includes a heater control module applied onto the first layer. The heater control module is configured to vary a voltage to the resistance heater at least partially in response to the input sensed by the capacitive sensor. The second layer is adjacent the heater control module, which is positioned between the first layer and the second layer.

In another embodiment, a system includes a composite panel. The composite panel includes a first layer made from an electrically non-conductive material, a resistance heater printed onto the first layer, and a heater control module applied onto the first layer. The heater control module is operable to vary a voltage to the resistance heater. The composite panel further includes a second layer adjacent the resistance heater and the heater control module. The resistance heater and the heater control module are positioned between the first layer and the second layer, which is made from an electrically non-conductive material. The resistance heater is configured to generate heat in response to the voltage. The system additionally includes a system control module that is external to the composite panel and operatively coupled with the heater control module to at least partially control operation of the heater control module.

According to some implementations of the system, the system control module is wirelessly coupled with the heater control module.

In certain implementations, the system also includes a passenger input receiver. The heater control module is operable to vary the voltage to the resistance heater at least partially in response to input provided by a passenger via the passenger input receiver. According to one example, the passenger input receiver includes a capacitive sensor applied onto the first layer and communicatively coupled with the heater control module to communicate the input provided by the passenger via the capacitive sensor to the heater control module. The capacitive sensor is positioned between the first layer and the second layer of the composite panel. In one example, The passenger input receiver alternatively, or additionally, includes a passenger mobile device communicatively coupled with the system control module to communicate input provided by the passenger via the passenger mobile device to the heater control module. The system control module can be configured to determine whether a temperature condition threshold has been reached and prevent the heater control module from varying the voltage to the resistance heater in response to input provided by the passenger via the passenger input receiver when the system control module determines the temperature condition threshold has been reached.

According to some implementations of the system, the heater control module is configured to monitor a health condition of the resistance heater and communicate the health condition to the system control module.

According to yet another embodiment, a method of making a composite panel includes providing a first electrically non-conductive layer. The method also includes applying a heater control module onto the first electrically non-conductive layer, applying a capacitive sensor onto the first electrically non-conductive layer, printing a resistance heater onto the first electrically non-conductive layer, and applying a second electrically non-conductive layer onto the heater control module, capacitive sensor, and resistance heater to form the composite panel.

In some implementations of the method, printing the resistance heater onto the first electrically non-conductive layer includes printing an electrically conductive layer onto the first electrically non-conductive layer using a conductive ink, and printing a heater layer onto the electrically conductive layer using a switching-type positive temperature coefficient ink. Applying the capacitive sensor onto the first electrically non-conductive layer can include printing the capacitive sensor onto the first electrically non-conductive layer. Printing the capacitive sensor and the resistance heater onto the first electrically non-conductive layer can include at least one of screen printing, inkjet printing, rotary screen printing, gravure printing, and atomized jetted depositing the capacitive sensor and the resistance heater onto the first electrically non-conductive layer.

According to certain implementations of the method, applying the heater control module onto the first electrically non-conductive layer includes printing the heater control module onto the first electrically non-conductive layer.

In some implementations, the method also includes shaping the composite panel into a non-planar shape. The method can further include at least one of hardening and curing the composite panel in the non-planar shape.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
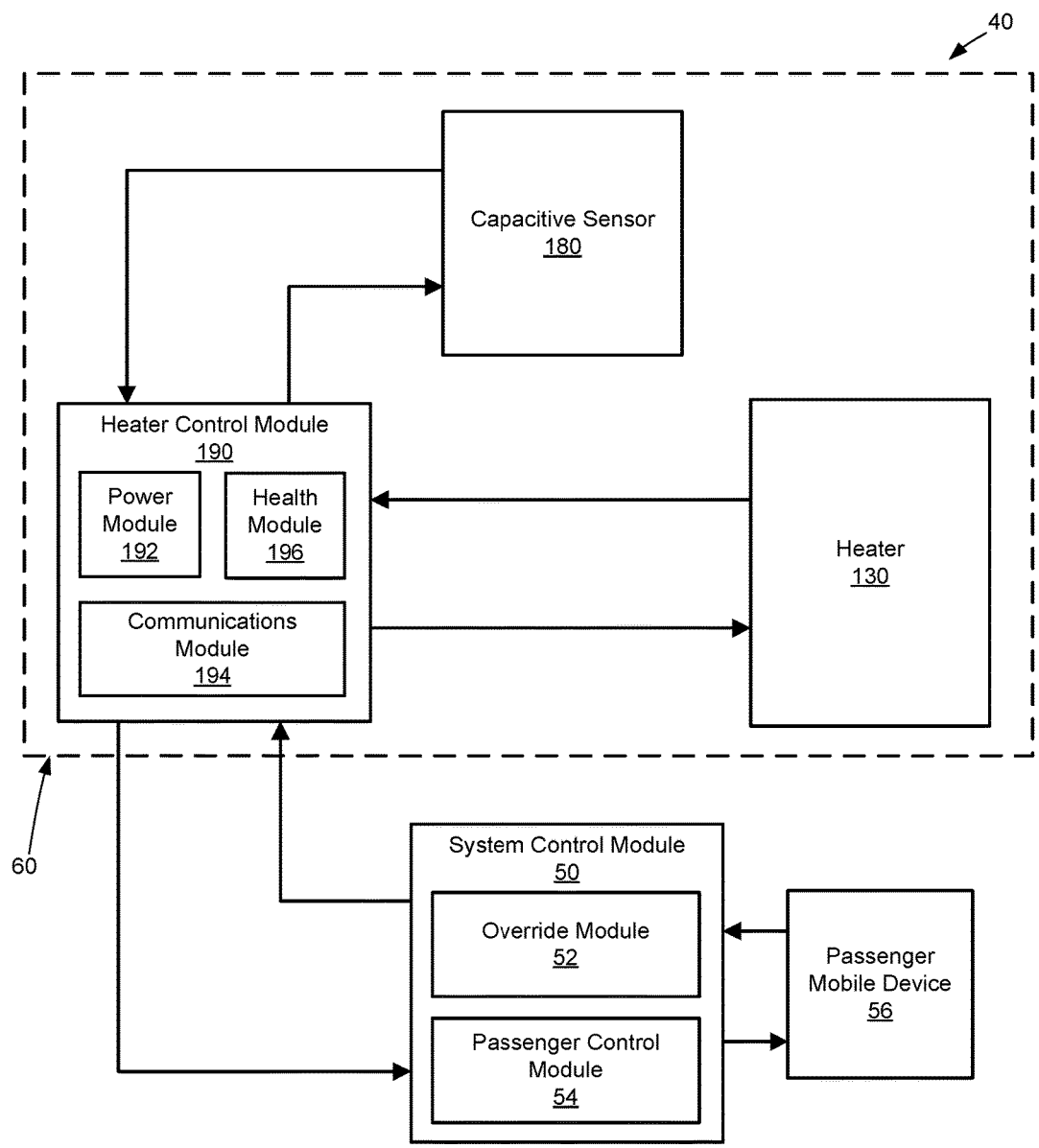
FIG. 1 is a schematic block diagram of a temperature control system for a vehicle, according to one or more embodiments of the present disclosure.

As shown in FIG. 1, and according to one embodiment, a temperature control system 40 of a structure, such as a mobile structure (e.g., a vehicle) or a non-mobile structure (e.g., building), includes a system control module 50 and an integrated heater system 60 operably coupled with the system control module 50. The integrated heater system 60 is integrated (e.g., embedded) into a composite (e.g., multi-layer or multi-ply) panel of the structure. In the illustrated implementation, the integrated heater system 60 includes a heater 130, a capacitive sensor 180, and a heater control module 190. The heater control module 190 includes hardware (e.g., circuits, relays, switches, digital I/O connectors, and the like) and logic that controls operation of the heater control module. In some implementations, the heater control module 190 is a thin-film flexible microchip, including, in one implementation, a plurality of transistors printed onto a flexible substrate. Generally, the heater control module 190 supplies electrical power to the heater 130, which can be a resistance heater that converts the electrical power into heat. The heat generated by the heater 130 can vary in response to the voltage of the electrical power supplied from the heater control module 190. Accordingly, a power module 192 of the heater control module 190 is configured to regulate (e.g., vary or modulate) the heat generated by the heater 130 by regulating the voltage of the electrical power supplied to the heater 130. The operations of the power module 192, and other operations of the heater control module 190, can be commanded via digital signals, such as pulse width modulation signals.

The power module 192 of the heater control module 190 regulates the voltage of the electrical power supplied to the heater 130 at least partially in response to input provided by a passenger input receiver. According to some embodiments, the passenger input receiver is one or more of the capacitive sensor 180 of the integrated heater system 60 or a passenger mobile device 56 (or other device external to the integrated heater system 60).

The capacitive sensor 180 can be any of various capacitive sensors or touch sensors configured to take the capacitance of the human body as input to the sensor. Generally, a capacitive sensor includes a grid or pattern of electrodes that detect changes in capacitance of the electrodes when a portion of a human body touches or is in close proximity to the electrodes.

The passenger mobile device 56 can be any of various mobile computing devices, such as mobile phones, laptops, tablets, watches, and the like. Passenger input received by the passenger mobile device 56, such as via an application running on the passenger mobile device, is communicated to the heater control module 190 via a passenger control module 54 of the system control module 50. More specifically, the passenger mobile device 56 may communicate passenger input, such as via a wired or wireless connection, to the passenger control module 54 of the system control module 50, which in turn communicates the passenger input, such as via a wired or wireless connection, to the communications module 194 of the heater control module 190. In one implementation, the passenger mobile device 56 is configured to sync with the passenger control module 54 and associate the seat in which a passenger using the passenger mobile device 56 is assigned with the heaters 130 in the area of the assigned seat. In this manner, a passenger can automatically control the temperature proximate his seat by linking his mobile device with his seat.

In some implementations, the communications module 194 includes hardware, such as antenna, transceivers, network interface controllers, and the like, for facilitating the receipt and transmission of electronic data communications. The system control module 50 may also be configured to supply electrical power to the power module 192 of the heater control module 190.

The system control module 50 may also include an override module 52 configured to override the control of the heater 130 by the passenger input receiver or disables control of the heater 130 by passengers. More specifically, under certain circumstances, the override module 52 is configured to prevent the passenger input receiver from controlling the heater 130 by preventing the heater control module 190 from varying the voltage to the heater 130 in response to the passenger input received from the passenger input receiver. According to some implementations, the override module 52 monitors one or more temperature conditions of the structure and overrides the control of the heater 130 by the passenger input receiver when one or more of the temperature conditions meets a threshold. For example, in one implementation, the override module 52 monitors an ambient temperature of an interior of the structure and, if the ambient temperature exceeds a maximum allowable temperature of the interior of the structure, the override module 52 overrides the control of the heater 130 by the passenger input receiver. According to another example, the override module 52 monitors the difference between the ambient temperature of an interior of the structure and a temperature of the composite panel and, if the difference exceeds a maximum allowable temperature difference, the override module 52 overrides the control of the heater 130 by the passenger input receiver.

In certain embodiments, the heater control module 190 further includes a health module 196 that monitors one or more health conditions of the integrated heater system 60, including the heater 130, and communicates the monitored health condition(s) to the system control module 50 via the communications module 194. According to some implementations, the health module 196 continuously communicates health conditions to the system control module 50. Alternatively, the health module 196 may communicate health conditions to the system control module 50 only when the health conditions meet a threshold. In response to the monitored health conditions, such as when a health condition meets a threshold, the system control module 50 may permanently or temporarily disable operation of the integrated heater system 60. The health condition(s) monitored by the health module 196 may be any of various conditions related to the performance, function, and/or safety of the heater 130. For example, the health condition can be a temperature of the heater 130 and the threshold can be a maximum allowable temperature of the heater 130. In one example, the health condition can be a capacitance reading from the capacitive sensor 180 and the threshold can be a maximum normal operating capacitance of the capacitive sensor 180. According to some embodiments, monitored health conditions are not communicated to the system control module 50 and the heater control module 190 is operable to disable operation of the integrated heater system 60 when a health condition meets a threshold.

In some embodiments, the system control module 50 forms part of an electronic control unit (ECU) of a vehicle. Moreover, the system control module 50 is positioned in a part of the vehicle (e.g., flight deck of an aircraft) remote from or distanced from the part of the vehicle in which the integrated heater system 60 is located (e.g., a passenger compartment of the aircraft).

Although the temperature control system 40 is shown to include a system control module 50, in some embodiments, the temperature control system 40 does not include a system control module 50 and utilizes only the integrated heater system 60 to control temperature.

Figure 2:
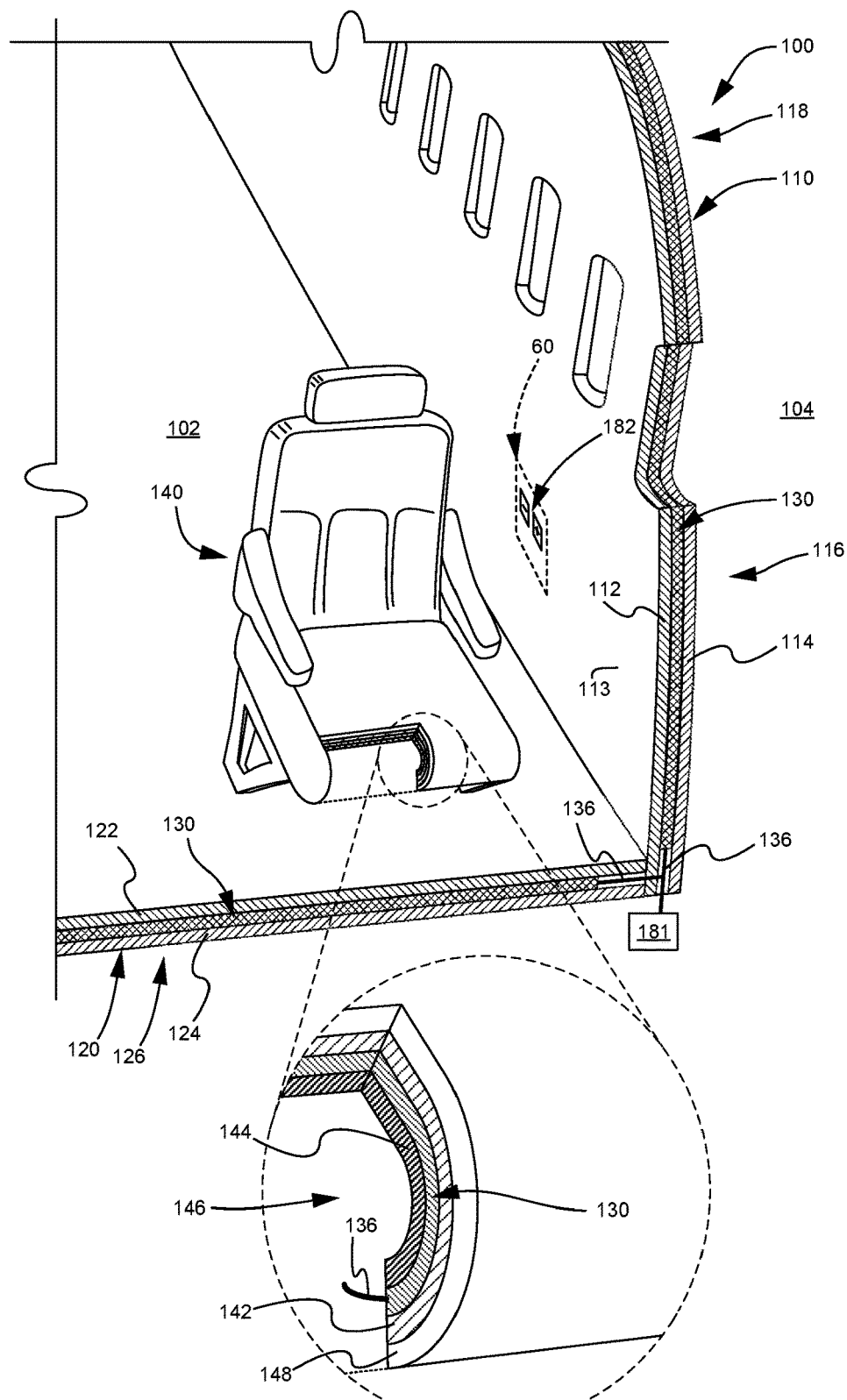
FIG. 2 is a schematic cross-sectional perspective view of a vehicle that includes composite panels with integrated heater systems, according to one or more embodiments of the present disclosure.

Referring to FIG. 2, and according to one embodiment, a vehicle 100 includes a plurality of structures, such as a sidewall 110, floor 120, and seat 140. Each of the structures may include one or more composite panels. As defined herein, a composite panel is a structure with at least two adjacent plies or layers each made from different materials. The adjacent plies are coupled to each other using any of various coupling techniques, such as fastening, bonding, adhesion, welding, and molding. Each layer may include separate sub-layers coupled together in the same or similar manner. The layers, and sub-layers, of a composite panel each has a thickness that is substantially greater than a length and width. Accordingly, in some implementations, the layers of a composite panel can be considered sheet-like. In certain embodiments, a composite panel is a sandwich panel with a core layer sandwiched between first and second adjacent layers. One of the adjacent layers may be defined as an external layer and the other may be defined as an internal layer. One or more of the external and internal layers can be a decorative layer or decorative laminate ply.

According to one example, the sidewall 110 of the vehicle 100, which can be an aircraft as depicted, includes a composite panel 116. The composite panel 116 includes the integrated heater system 60, which includes the resistance heater 130 or heater layer, positioned between first and second layers 112, 114, respectively. In some implementations, the integrated heater system 60 is one ply of a plurality of plies forming a composite stackup or laminate of the composite panel 116. Because the integrated heater system 60 is one ply of a plurality of plies of the composite panel 116, and sandwiched between adjacent plies, the heater system is defined as an integrated heater system or a heater system integrated into the composite panel 116.

The first layer 112 is depicted as an internal layer facing an interior 102 of the vehicle 100, and the second layer 114 is depicted as an external layer facing an exterior 104 of the vehicle. Moreover, the first layer 112 can define an internal façade or decorative laminate ply of the sidewall 110. For example, as shown, the temperature control system 40 includes indicia 182 on an interior surface 113 of the first layer 112 over the capacitive sensor 180 of the integrated heater system 60. The indicia 182 indicating a location on the interior surface 113 that a passenger may touch to provide corresponding input to the capacitive sensor 180 under the first layer 112. Although in the illustrated example, the indicia 182 includes an indicium "−" indicating a reduction in heat and indicium "+" indicating an increase in heat, any of various other indicia corresponding to the configuration and location of the capacitive sensor 180 can be used. In certain implementations, the first layer 112 includes decorative non-planar features. Although the first layer 112 is depicted as an internal layer and the second layer 114 is depicted as an external layer, the composite panel 116 may include one or more additional layers internally of the first layer 112 and/or externally of the second layer 114. Coupled to the integrated heater system 60 is a set 136 of electrical terminals or contacts configured to supply electrical signals, such as power and communication signals, to the integrated heater system 60 from an electrical power source 181, which may be controlled by the system control module 50 as described above to supply power and communications to the integrated heater system 60 and/or receive communications from the integrated heater system 60.

The composite panel 116 forms a portion of the sidewall 110 including planar and non-planar sections of the sidewall 110. As defined herein, a composite panel 116 has a non-planar shape when the broad-faced surfaces of the layers of the panel perpendicular to the thicknesses of the layers are non-planar (e.g., contoured or curved). For example, the composite panel 116 is formed into a non-planar or 3-dimensional shape defining a contoured or curved portion 118 of the sidewall 110.

Similar to the sidewall 110, the floor 120 of the vehicle 100 may also include a composite panel 126. The composite panel 126 of the floor 120, like the composite panel 116, includes a resistance heater 130 positioned between first and second layers 122, 124, respectively, and thus integrated into the composite panel 126. The resistance heater 130 in the floor 120 forms part of the integrated heater system 60. More specifically, the integrated heater system 60 can include multiple heaters 130 with each one being controlled by a single or multiple heater control modules 190 of the integrated heater system 60.

The first layer 122 is depicted as an internal layer facing an interior 102 of the vehicle 100, and the second layer 124 is depicted as an external layer facing an exterior 104 of the vehicle. Although the first layer 122 is depicted as an internal layer and the second layer 124 is depicted as an external layer, the composite panel 126 may include one or more additional layers internally of the first layer 122 and/or externally of the second layer 124. In one implementation, the first layer 122 can define a floor panel on which another layer, such as a carpet layer, is applied. In other implementations, the first layer 122 can be a carpet layer with the resistance heater 130 being applied (e.g., bonded) directly to the carpet layer. The same set 136 of electrical terminals or contacts for supplying electrical power to the resistance heater 130 of the composite panel 116, or a different set 136 of electrical terminals or contacts, is electrically coupled to the resistance heater 130 of the composite panel 126.

As with the sidewall 110 and the floor 120, an interior structure, such as the seat 140, may also include a composite panel 146. The composite panel 146 of the seat 140 includes a resistance heater 130 positioned between first and second layers 142, 144, respectively, and thus integrated into the composite panel. The resistance heater 130 in the seat 140 forms part of the integrated heater system 60. Accordingly, in some implementations, a single heater control module 190 is configured to individually or independently control the operation of multiple heaters 130 in different locations of the vehicle 100. Such control can be at least partially responsive to input, provided by a passenger input receiver, corresponding to a particular one or more of the multiple heaters 130. For example, the capacitive sensor 180 can be configured to receive separate inputs for separately selecting desired heating characteristics of the multiple heaters 130. In such an example, the indicia 182 may have indicium associated with heating controls of the heater 130 in the sidewall 110, indicium associated with heating controls of the heater 130 in the floor 120, and indicium associated with heating controls of the heater 130 in the floor 120. In another example, the passenger mobile device 56 may be configured to provide an interface for receiving separate inputs each associated with controlling the heating characteristics of one of the multiple heaters 130.

The first layer 142 of the seat 140 is depicted as an outward layer of the seat 140, and the second layer 144 is depicted as an inward layer of the seat. The composite panel 146 may include a third layer 148 coupled to the first layer 142. The third layer 148 can be considered a second outward layer of the seat 140. In one implementation, the third layer 148 may include a cushion and/or surface upon which a user may sit. It is recognized that the composite panel 146 of the seat 140 may include one or more additional outward layers coupled to and positioned outwardly of the third layer 148. Alternatively, in some implementations, the first layer 142 may include a cushion and/or surface upon which a user may sit, and the resistance heater 130 may be bonded directly to the cushion and/or surface. Although the second layer 144 is depicted as the only inward layer, the composite panel 146 may include one or more additional inward layers inwardly of the second layer 144. The same set 136 of electrical terminals or contacts for supplying electrical power to one or both of the resistance heaters 130 of the composite panels 116, 126, or a different set 136 of electrical terminals or contacts, is electrically coupled to the resistance heater 130 of the composite panel 146.

Although the vehicle 100 is depicted as an aircraft, and the sidewall 110, floor 120, and seat 140 of the vehicle are depicted as having a composite panel, it is recognized that in some embodiments the vehicle can be any of various other vehicles or mobile structures, such as automobiles, boats, spacecraft, and the like, and other structures of the vehicle can include a composite panel. Moreover, as mentioned above, in certain embodiments, the composite panels of the present disclosure can be used to form part of non-mobile structures, such as buildings and bridges. Also, although a limited number of layers of the composite panels of the vehicle 100 are shown, the composite panels of the vehicle can include any additional number of layers, and the vehicle can include any number of additional features, structures, layers, etc. coupled to the composite panels. Additionally, it is recognized that the size, including the thickness, of the composite panels relative to the size of the vehicle is illustrated for clarity in showing the features of the composite panels and is not drawn to scale.

Figure 3A:
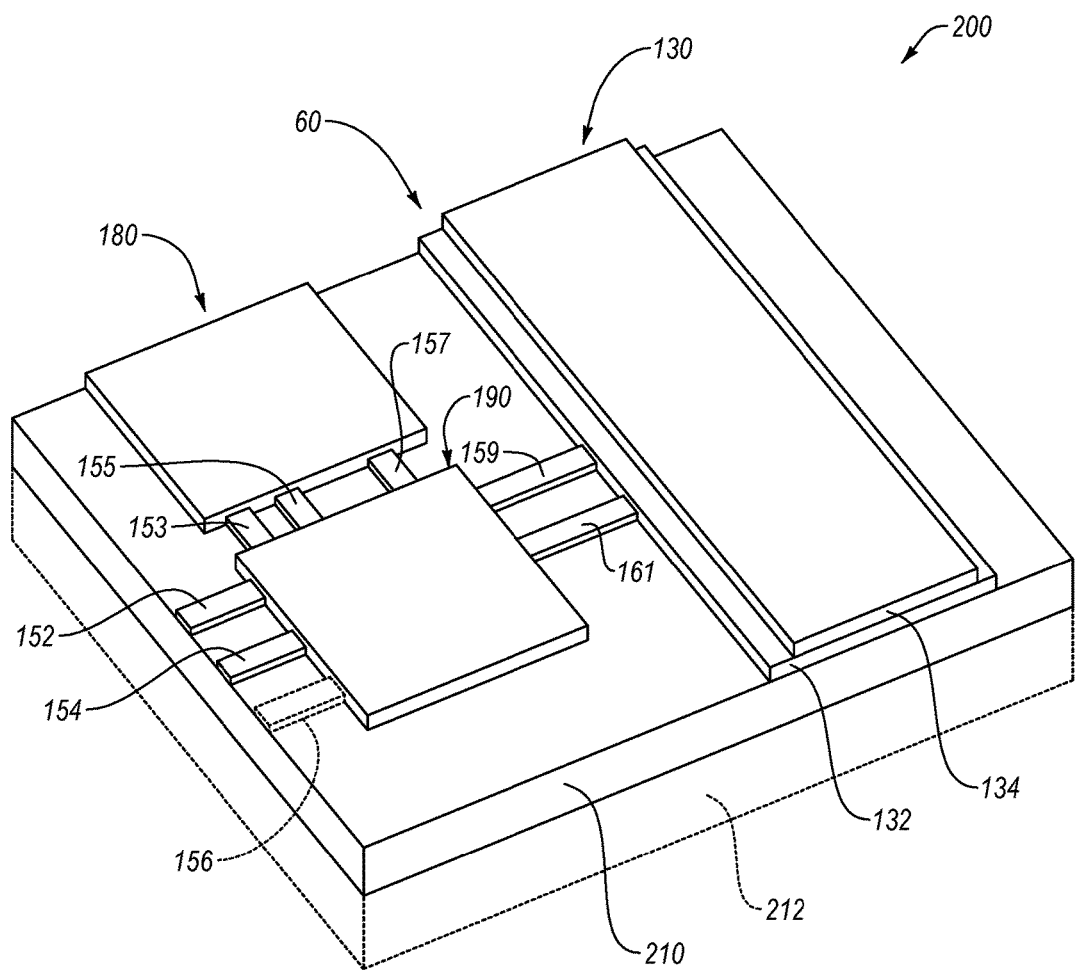
FIG. 3A is a schematic perspective view of a composite panel with an integrated heater system, shown in a planar configuration with a layer removed for convenience in showing the features of the integrated heater system, according to one or more embodiments of the present disclosure.

Referring to FIG. 3A, one embodiment of a composite panel 200 includes a first layer 210 and a resistance heater 130 printed onto the first layer 210 and integrated into the composite panel. The first layer 210 or first ply is made from an electrically non-conductive material, such as, for example, fiberglass, plastic, ceramic, silicone, fabric, and the like. In one implementation, the first layer 210 is a thin film with a thickness in the range of between a nanometer and several micrometers. In other implementations, the first layer 210 has a thickness greater than several micrometers. As shown, in a first configuration, the first layer 210 has a substantially planar shape. The first layer 210 may be substantially rigid or non-flexible in some implementations such that the first layer 210 remains in the first configuration or is not configurable into a second configuration (see, e.g., FIG. 3B). However, in certain other implementations, the first layer 210 is made from a non-rigid flexible material such that it can be flexed or moved into a non-planar shape to configure the first layer 210 into a second configuration. For example, as explained below in more detail with reference to FIGS. 4A and 4B, the first layer 210, as well as the resistance heater 130, heater control module 190, and capacitive sensor 180, can be flexed from the first configuration into the second configuration using a die system 300, which shapes and cures the composite panel 200 in the second configuration.

The resistance heater 130 includes a first ink layer 132 printed onto the first layer 210 and a second ink layer 134 printed onto the first ink layer 132. In the first configuration as shown, the first and second ink layers 132, 134 of the resistance heater 130 have a substantially planar shape. The first ink layer 132 is made from a first ink and the second ink layer 134 is made from a second ink. The first ink is different than the second ink. For example, the first ink is an electrically conductive ink and the second ink is a switching-type positive temperature coefficient (PTC) ink. Each of the first and second ink layers 132, 134 is a thin film made from the hardened first and second inks, respectively.

Like conventional printing inks, the first and second inks are liquid or semi-viscous in a pre-printing state and are solid in a post-printing state following printing and drying of the ink on a substrate. Each of the first and second inks includes a solvent with additives that contribute to the electrical conductivity and thermal properties of the inks.

The first ink includes additives that promote the electrical conductivity of the first ink, and by extension, the first ink layer 132. In some implementations, the additives of the first ink include electrically conductive fibers or filaments each made from an electrically conductive material, such as silver, carbon, and the like.

The second ink includes additives that promote the thermally self-regulating properties of the second ink, and by extension, the second ink layer 134. More specifically, the additives of the second ink are made from materials that collectively make the second ink have a switching-type positive temperature coefficient (PTC). In some implementations, the switching-type PTC ink of the second ink layer 134 is made from poly-crystalline ceramic materials, such as barium carbonate and titanium oxide, that are highly electrically resistive in an original state, but are made semi-conductive by the addition of dopants, such as tantalum, silica, and manganese. Accordingly, the switching-type PTC ink of the second ink layer 134 may include a combination of poly-crystalline ceramic materials and conductive dopants. In other implementations, the switching-type PTC ink of the second ink layer 134 is made from an electrically non-conductive plastic material with embedded conductive grains, such as carbon grains.

Generally, the switching-type PTC ink of the second ink layer 134 self-regulates or self-limits the temperature of the second ink layer by increasing the electrical resistance of the switching-type PTC ink as the temperature of the switching-type PTC ink increases. As the temperature approaches an equilibrium temperature, which can be defined as a maximum, transition, or Curie temperature of the PTC ink, the electrical resistance of the PTC ink "switches" to rapidly increases toward infinite resistance. In some implementations, the equilibrium temperature is defined as the temperature at which the electrical resistance of the PTC ink is about twice the resistance as a minimum electrical resistance of the PTC ink. The rapid increase in the electrical resistance at the equilibrium temperature rapidly reduces the electrical current allowed to flow through the PTC ink. With less current flowing through the PTC ink, the temperature of the PTC ink correspondingly drops below the equilibrium temperature, which results in a corresponding drop in the electrical resistance of the PTC ink and an increase in the current allowed through the PTC ink. The increase in current contributes to an increase in the temperature of the PTC ink until the equilibrium temperature is again established and the cycle of rapidly increasing the electrical resistance, rapidly decreasing the current, and decreasing the temperature of the PTC ink is continued.

In the above manner, with the supply of electrical power from an electrical power source at a constant (e.g., unchanging) voltage above an equilibrium voltage, the unique properties of the PTC ink allow the PTC ink to self-limit its temperature to increase up to but not exceed an equilibrium temperature. Furthermore, because the PTC ink self-regulates its temperature, extraneous components and systems for regulating the temperature of resistance heater 130 are not necessary. Although the second ink of the second ink layer 134 has been described as being a PTC ink, in other embodiments, the second ink can be made from any of various other electrically-conductive inks.

The heater control module 190 is applied onto the first layer 210 concurrently or non-concurrently with the printing of the resistance heater 130 onto the first layer 210. In some implementations, the heater control module 190 is pre-manufactured or pre-formed and mounted onto the first layer 210 such as via a bonding, fastening, or adhesion process. However, in other implementations, the heater control module 190 is formed on the first layer 210 by printing the hardware (e.g., transistors) of the heater control module 190 directly onto the first layer 210.

Similar to the heater control module 190, the capacitive sensor 180 is applied onto the first layer 210 concurrently or non-concurrently with the printing of the resistance heater 130 onto the first layer 210. In some implementations, the capacitive sensor 180 is pre-manufactured or pre-formed and mounted onto the first layer 210 such as via a bonding, fastening, or adhesion process. However, in other implementations, the capacitive sensor 180 is formed on the first layer 210 by printing the traces of the capacitive sensor 180 directly onto the first layer 210.

Accordingly, in some implementations, the first layer 210 and integrated heater system 60, including the resistance heater 130, heater control module 190, and capacitive sensor 180, together form a thin film ply that can be combined with other plies (e.g., base layer 212 and second layer 220) to form a composite panel with minimal effect on the overall thickness and weight of the composite panel. For example, the integrated heater system 60 may form a relatively thin ply that is applied onto a first layer 210, which is bonded to an optional base layer 212, which can be a relatively thick ply made of a core material, such as a honeycomb structure, that provides a comparatively higher portion of the strength of the composite panel 200 than the first layer 210 and the integrated heater system 60. Alternatively, in certain implementations, the first layer 210 (along with a sandwiching second layer 220) and integrated heater system 60 form the entirety of the composite panel 200. In such implementations, the first layer 210 may be substantially thicker than a thin film.

Electrical power is supplied to the heater control module 190 via the set 136 of electrical terminals 152, 154 or traces, which receive electrical power from an electrical power source (e.g., electrical power source 181). Each of the electrical terminals 152, 154 can be electrically coupled to a respective one of a positive and negative terminal of a power source, such as a battery supplying a DC power signal. The electrical terminals 152, 154 can be made from an electrically conductive ink, such as the same ink as the first ink layer 132 of the resistance heater 130, and be co-formed with the first ink layer 132, such as via an ink printing process. Alternatively, the electrical terminals 152, 154 can be formed separately from the first ink layer 132 and coupled to the first layer 210 using any of various coupling techniques.

The heater control module 190 supplies electrical power to the capacitive sensor 180 via electrical terminals 153, 155 or traces, and supplies electrical power to the first ink layer 132 of the resistance heater 130 via electrical terminals 159, 161 or traces. The electrical terminals 153, 155 can be applied or coupled to the first layer 210 in a manner similar to the electrical terminals 152, 154. In some implementations, the heater control module 190 passively supplies electrical power to the capacitive sensor 180. However, in other implementations, the capacitive sensor 180 receives electrical power directly from the electrical terminals 152, 154 without the electrical power being routed first through the heater control module 190. The heater control module 190 actively and dynamically controls the transmission of electrical power to the first ink layer 132 of the resistance heater 130 via input (e.g., passenger input and/or system input) received from one or both of the capacitive sensor 180 (e.g., via communication line 157) and the system control module 50 (e.g., via communication line 156, which is optionally included in embodiments where the system control module 50 may control operation of the heater 130). The communication lines 156, 157 can be configured and formed similarly to the electrical terminals 152, 153, 154, 155, 159, 161, except communication lines 156, 157 transmit communication signals, as opposed to power signals.

Electrical power is supplied to the second ink layer 134 of the resistance heater 130, to heat the second ink layer 134, via the first ink layer 132 of the resistance heater 130. More specifically, electrical power supplied to the first ink layer 132 is transmitted from the first ink layer 132 to the second ink layer 134 via direct electrical contact between the first and second ink layers 132, 134 of the resistance heater 130.

Figure 3B:
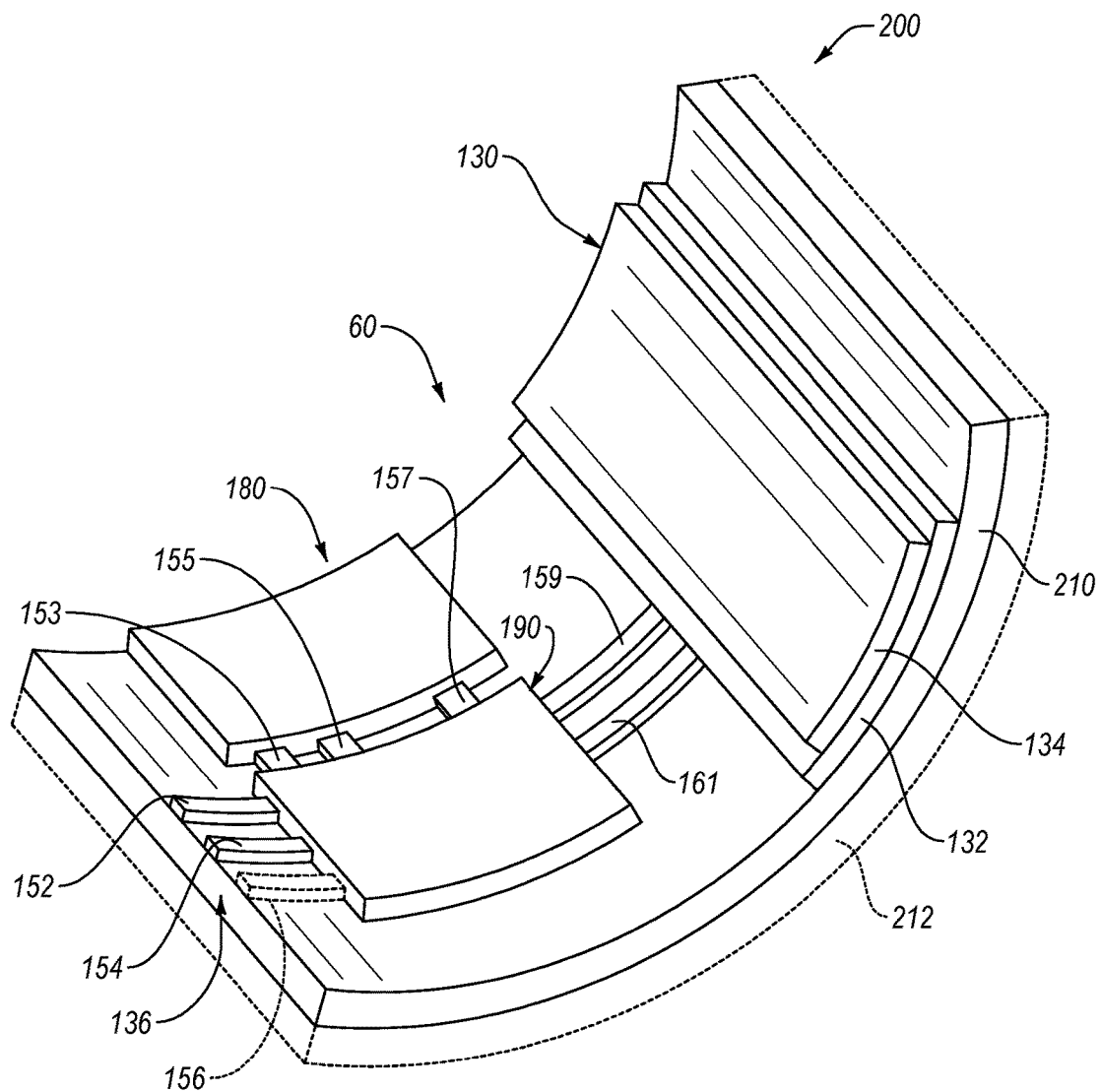
FIG. 3B is a schematic perspective view of a composite panel with an integrated heater system, shown in a non-planar configuration with a layer removed for convenience in showing the features of the integrated heater system, according to one or more embodiments of the present disclosure.

Referring to FIG. 3B, according to one embodiment, the composite panel 200 is shown in a second configuration. In the second configuration, the first layer 210 and the integrated heater system 60, including the resistance heater 130, heater control module 190, and capacitive sensor 180, have a substantially non-planar shape. More specifically, the first layer 210 and integrated heater system 60 are curved. Optionally, a base layer 212 coupled to the first layer 210 may also be curved as shown. Although the composite panel 200 depicted in FIG. 3B has a simple non-planar shape (e.g., curved about a single axis), in other embodiments, the composite panel 200 can have any of various complex non-planar shapes.

Figure 3C:
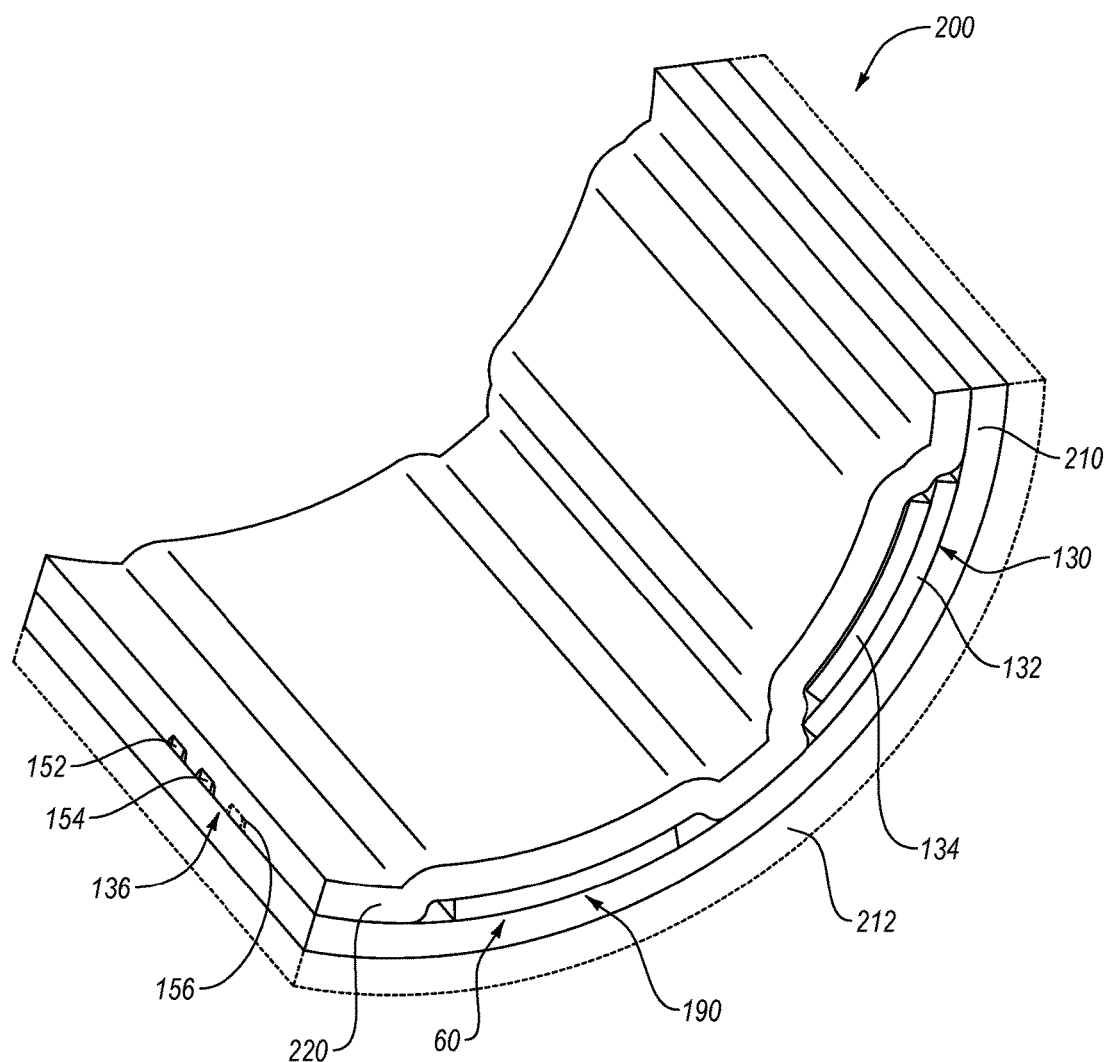
FIG. 3C is a schematic perspective view of the composite panel of FIG. 3B, but shown with the layer removed from FIG. 3B, according to one or more embodiments of the present disclosure.

Referring to FIG. 3C, according to another embodiment, the composite panel 200 includes a second layer 220 coupled to the integrated heater system 60 such that the integrated heater system 60 is positioned directly between the first and second layers 210, 220. In this manner, the integrated heater system 60 is sandwiched between the first and second layers 210, 220 to form the composite panel 200. As shown, the composite panel 200 is in the second configuration. In the second configuration, the first and second layers 210, 220 and the integrated heater system 60 have a substantially non-planar shape, but could have a planar shape in a first configuration.

The second layer 220 or second ply is made from an electrically non-conductive material. Moreover, the second layer 220 can be an external layer of the composite panel 200, such as for forming a façade of a structure. Alternatively, one or more additional layers can be coupled to the second layer 220 such that the second layer 220 is positioned between the additional layers and the integrated heater system 60 to act as an internal layer within the composite panel 200. The second layer 220 may also sandwich the electrical terminals 152, 153, 154, 155, 159, 161 and communication lines 156, 157 between the second layer 220 and the first layer 210. In certain implementations, such as shown, the second layer 220 may be directly coupled to the first layer 210 at two or more ends to substantially envelope the integrated heater system 60 between the first and second layers.

Figure 4A:
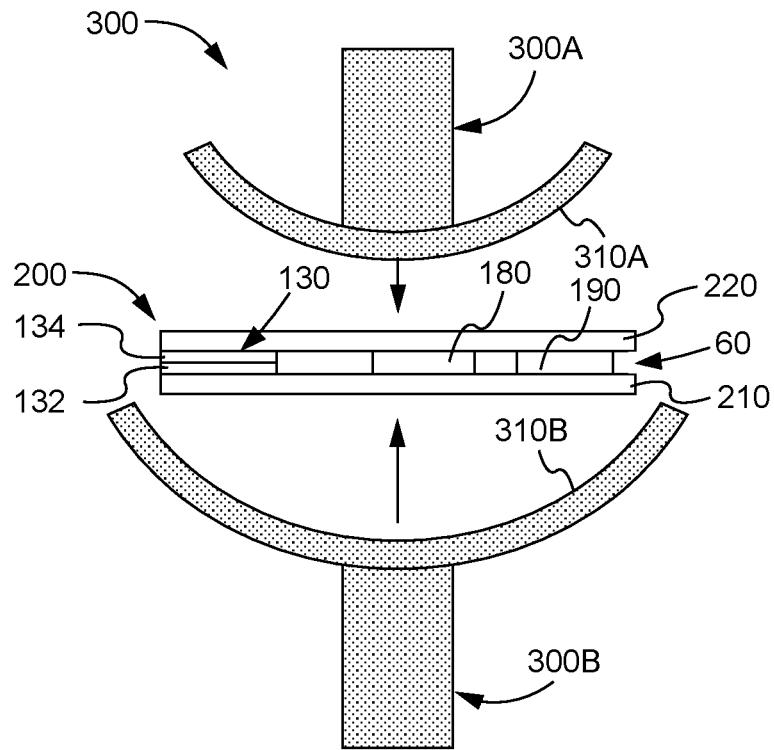
FIG. 4A is a schematic side elevation view of a system for making a composite panel with an integrated heater system shown in a pre-shaping configuration, according to one or more embodiments of the present disclosure.
Figure 4B:
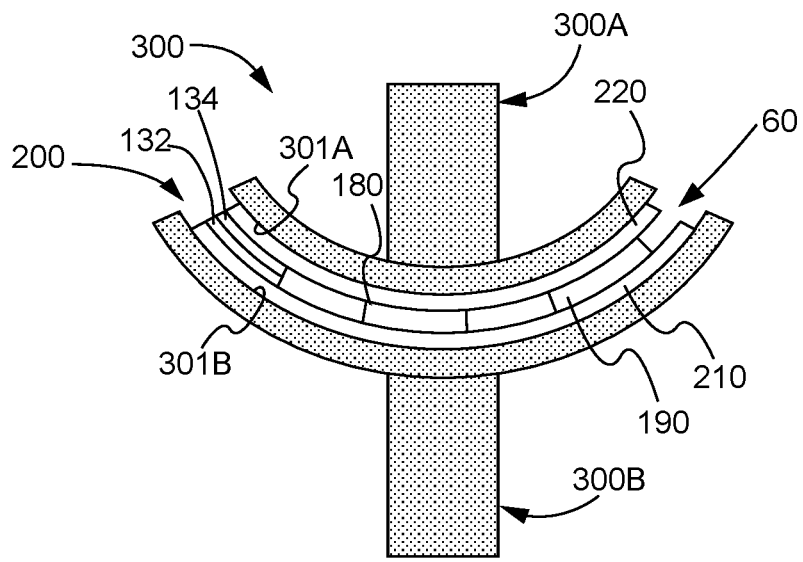
FIG. 4B is a schematic side elevation view of the system of FIG. 3A shown in a shaping configuration, according to one or more embodiments of the present disclosure.

Referring now to FIGS. 4A and 4B, a die system 300 includes opposing dies 300A, 300B. The dies 300A, 300B define opposing and complimentary surfaces 310A, 310B, respectively. The surfaces 310A, 310B are shaped to define a desired non-planar shape of the composite panel 200. Although not shown, the die system 300 includes actuators to move the opposing dies 300A, 300B toward and away from each other to respectively shape and release a flexible composite panel 200 between the dies. As shown in FIG. 4A, with a composite panel 200 positioned between the dies 300A, 300B, the dies are actuated toward each other as indicated by directional arrows. As the dies 300A, 300B move closer together, the surfaces 310A, 310B contact and deform the composite panel 200 according to the shape of the surfaces until the composite panel is deformed into the desired non-planar shape as shown in FIG. 4B.

In certain implementations, the layers (e.g., first layer 210, second layer 220, and integrated heater system 60) of the composite panel 200 are bonded tougher using a resin-based bonding agent, or one or more of the layers is made from a resin-based material. Furthermore, the dies 300A, 300B may be heated and configured to compress the composite panel 200. Heat transfer from the dies 300A, 300B to the resin-based bonding agent and/or materials, including the compressive force applied to the uncured composite panel 200 by the dies, acts to cure the resin and permanently form the composite panel 200 in the desired non-planar shape. Due to the ability of the inks of the ink layers 132, 134, and the capacitive sensor 180 and heater control module 190 in some implementations, to deform and easily transfer phases between solid and liquid, the heat transfer to, compression of, and deformation of the inks during the formation of the composite panel 200 does not result in damage to or electrical disconnectivity in the ink layers. For this reason, and in view of this disclosure, the formation of the integrated heater system 60 using printed inks allows the use of integrated heater systems in stacked or composite panels as described herein. Although described above as applying both heat and compression to the composite panel 200, in some implementations, the dies 300A, 300B may be configured to apply only one of heat and compression to cure resin in and form the composite panel in the desired non-planar shape.

In some implementations, the composite panel 200 can be formed into a non-planar shape using techniques other than those associated with the die system 300. For example, an uncured flexible composite panel 200 can be shaped into a desired non-planar shape using casts, jigs, or molds and allowed to cure in ambient temperature conditions. Alternatively, as will be described below, the first layer 210 of the composite panel 200 can be pre-formed into a non-planar shape and the components of the integrated heater system 60 can be printed onto a non-planar surface of the first surface.

Figure 5A:
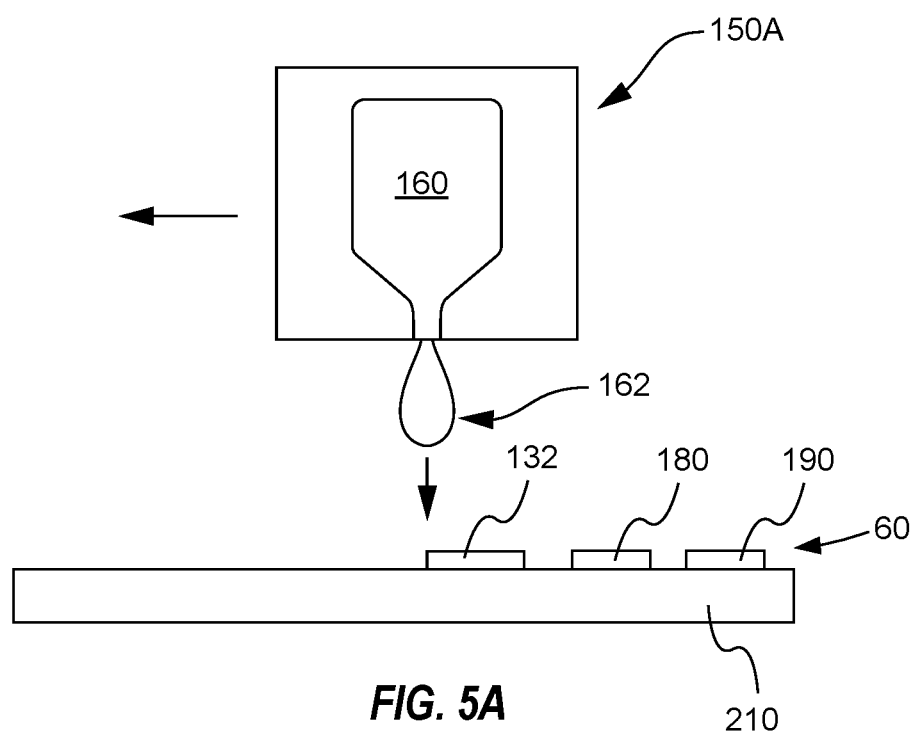
FIG. 5A is a schematic side elevation view of a system for printing conductive ink and at least one of a capacitive sensor and a heater control module onto a layer of a composite panel, according to one or more embodiments of the present disclosure.
Figure 5B:
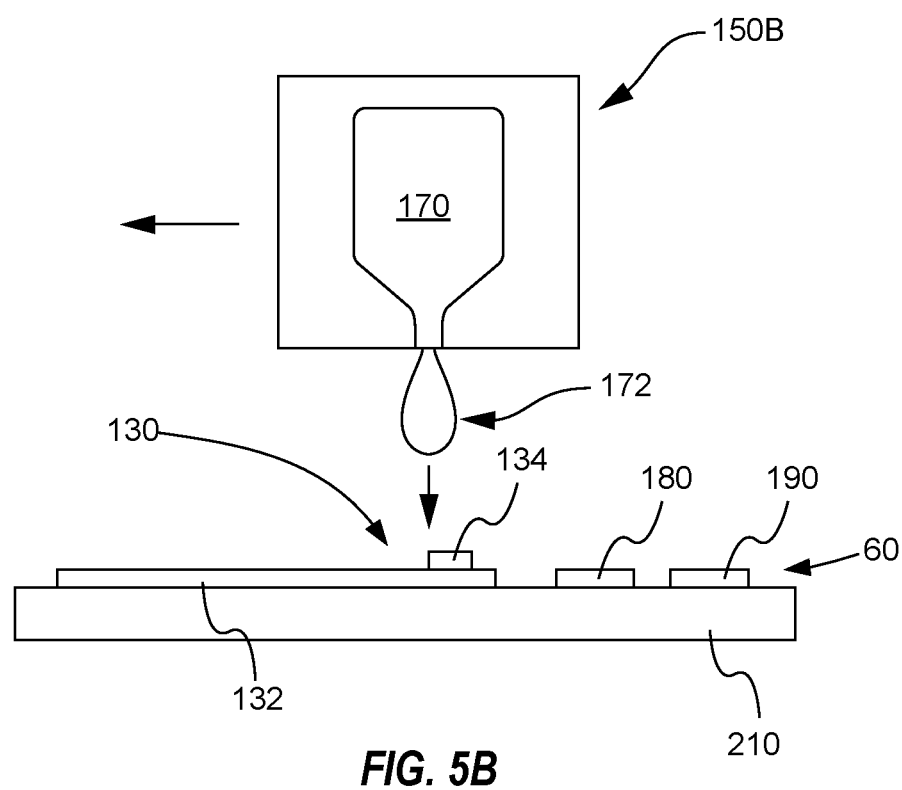
FIG. 5B is a schematic side elevation view of a system for printing switching-type positive temperature coefficient ink onto the conductive ink layer of the composite panel of FIG. 5A, according to one or more embodiments of the present disclosure.

Referring to FIGS. 5A and 5B, in one embodiment, at least some components of the integrated heater system 60 can be printed onto the first layer 210 of the composite panel 200 using at least one ink printing head. In the illustrated embodiment, a printer (not shown) includes two ink printing heads 150A, 150B for printing the first and second inks, respectively, of the first and second ink layers 132, 134. As shown in FIG. 5A, the first ink printing head 150A includes a first ink source 160 containing a first ink and a nozzle for dispensing a first ink 162 from the first ink source. As shown by directional arrows, the first ink printing head 150A moves translationally relative to (e.g., parallel to) a surface of the first layer 210 onto which the first ink layer 132 is to be printed. As the first ink printing head 150A moves along the surface of the first layer 210, the first ink printing head dispenses the first ink 162 onto the surface of the first layer to form the first ink layer 132. Desirably, in some implementations, the first ink printing head 150A dispenses a uniform thickness of the first ink 162 onto the first layer 210 to form the first ink layer 132. The first ink 162 is an electrically conductive ink as described above.

As shown in FIG. 5B, after printing the first ink layer 132, the second ink printing head 150B, which includes a second ink source 170 containing a second ink and a nozzle for dispensing a second ink 172 from the second ink source, moves translationally along a surface of the first ink layer 132 onto which the second ink layer 134 is to be printed. As the second ink printing head 150B moves along the surface of the first ink layer 132, the second ink printing head dispenses the second ink 172 onto the surface of the first ink layer to form the second ink layer 134. Desirably, in some implementations, the second ink printing head 150B dispenses a uniform thickness of the second ink 172 onto the first ink layer 132 to form the second ink layer 134. The second ink 172 is a switching-type PTC ink as described above.

Referring back to FIG. 5A, in some embodiments, the first ink printing head 150A, or other ink printing head, can also be used to print the capacitive sensor 180 and/or heater control module 190 onto the first layer 210. For example, as the first ink printing head 150A, or other ink printing head, moves relative to the surface of the first layer 210, the first ink printing head 150A, or other ink printing head, dispenses the first ink 162, or another ink, onto the surface of the first layer to form the capacitive sensor 180 and/or the heater control module 190. Alternatively, one or both of the capacitive sensor 180 or heater control module 190 can be printed onto the first layer 210 during a different printing process, or preformed and mounted onto the first layer 210 prior to or after the resistance heater 130 is printed onto the first layer 210.

Although ink printing heads 150A, 150B can be used to print components of the integrated heater system 60 using an inkjet printing process, it is recognized that other printing techniques can be used to print the first and second ink layers. For example, in some implementations, components of the integrated heater system 60 are printed using one or more conventional printing processes, such as screen printing, rotary screen printing, and gravure printing processes. Also, in certain implementations, components of the integrated heater system 60 are printed using conventional atomized jetted deposition techniques, which may include airbrushing the ink layers using an airbrush coupled to a gantry.

Figure 6:
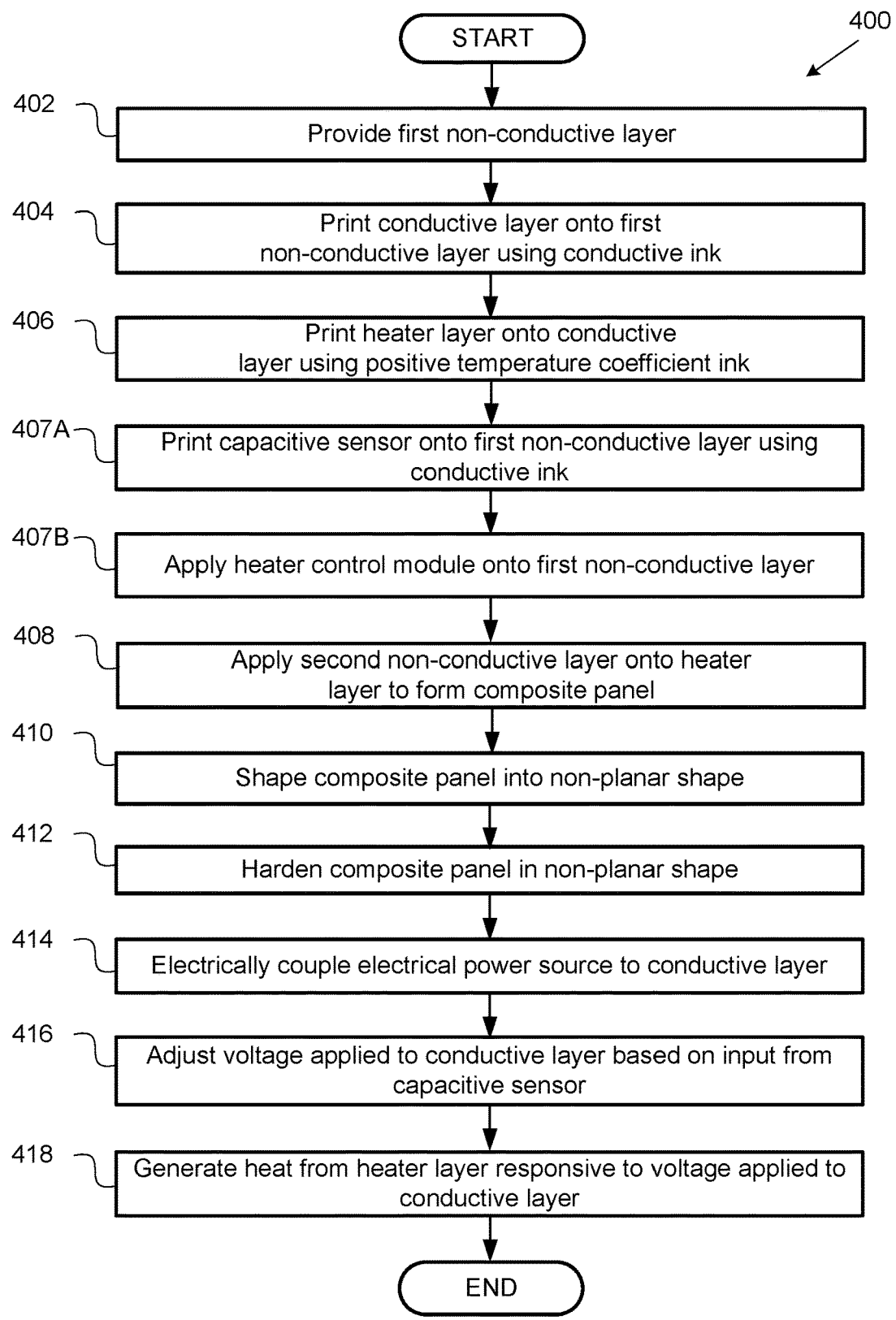
FIG. 6 is a schematic flow diagram of a method of making and using a composite panel with an integrated heater system, according to one or more embodiments of the present disclosure.

Referring to FIG. 6, one embodiment of a method 400 of making and using a composite panel with an integrated heater system is shown. Generally, according to an embodiment, the method 400 provides at least one implementation of a crush core manufacturing technique. Notwithstanding, other crush core manufacturing techniques, or any of various other manufacturing techniques, could be used to make a composite panel as described herein without departing from the essence of the present disclosure. The method 400 includes providing a first non-conductive layer, which can be flexible, at 402. Additionally, the method 400 includes printing a conductive layer onto the first non-conductive layer using a conductive ink at 404. Then, the method 400 includes printing a heater layer onto the first non-conductive layer using a PTC ink, or other ink, at 406. The method 400 also includes printing a capacitive sensor or similar sensor onto the first non-conductive layer using conductive ink at 407A and applying (e.g., mounting or printing) a heater control module onto the first non-conductive later at 407B. Additionally, the method 400 includes applying or coupling a second non-conductive layer, which may be flexible, onto the heater layer, capacitive sensor, and heater control module, to form a composite panel at 408.

The method 400 can further include shaping the composite panel into a non-planar shape at 410 and hardening the composite panel in the non-planar shape at 412. Also, the method 400 includes electrically coupling an electrical power source to the conductive layer at 414.

The method 400 includes adjusting a voltage applied to the conductive layer based on input from the capacitance sensor at 416. The voltage can be an equilibrium voltage defined as a voltage sufficiently high that if constantly applied to the heater layer would allow the temperature of the heater layer to reach the equilibrium temperature. The method 400 additionally includes, at 418, generating heat from the heater layer responsive to the voltage applied to the conductive layer.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A composite panel, comprising:
   a flexible first layer made from an electrically non-conductive material;
   a resistance heater printed onto the first layer;
   a flexible heater control module applied to the first layer;
   a capacitive sensor applied onto the first layer, the capacitive sensor being operably coupled with the resistance heater; and
   a second layer adjacent the resistance heater and the capacitive sensor, the resistance heater and the capacitive sensor being positioned between the first layer and the second layer, and the second layer being made from an electrically non-conductive material;
   wherein the resistance heater is configured to generate heat at least partially in response to input sensed by the capacitive sensor.

2. The composite panel of claim 1, wherein the resistance heater comprises a first ink layer printed onto the first layer and a second ink layer printed onto the first ink layer, the first ink layer being made from a first ink and the second ink layer being made from a second ink different than the first ink.

3. The composite panel of claim 2, wherein the first ink comprises an electrically conductive ink and the second ink comprises a switching-type positive temperature coefficient ink.

4. The composite panel of claim 1, wherein the first layer, resistance heater, capacitive sensor, and second layer together form a sandwich panel, the sandwich panel having a non-planar shape.

5. The composite panel of claim 1, wherein the resistance heater, capacitive sensor, and second layer are flexible.

6. The composite panel of claim 1, wherein:
   the heater control module is configured to vary a voltage to the resistance heater at least partially in response to the input sensed by the capacitive sensor;
   the second layer is adjacent the heater control module; and
   the heater control module is positioned between the first layer and the second layer.

7. A system, comprising:
   a composite panel, comprising:
      a first layer made from an electrically non-conductive material;
      a resistance heater printed onto the first layer;
      a flexible heater control module applied onto the first layer, wherein the heater control module is operable to vary a voltage to the resistance heater; and
      a second layer adjacent the resistance heater and the heater control module, the resistance heater and the heater control module being positioned between the first layer and the second layer, and the second layer being made from an electrically non-conductive material;
      wherein the resistance heater is configured to generate heat in response to the voltage; and
   a system control module external to the composite panel and operatively coupled with the heater control module to at least partially control operation of the heater control module.

8. The system of claim 7, wherein the system control module is wirelessly coupled with the heater control module.

9. The system of claim 7, further comprising a passenger input receiver, wherein the heater control module is operable to vary the voltage to the resistance heater at least partially in response to input provided by a passenger via the passenger input receiver.

10. The system of claim 9, wherein:
   the passenger input receiver comprises a capacitive sensor applied onto the first layer and communicatively coupled with the heater control module to communicate the input provided by the passenger via the capacitive sensor to the heater control module; and
   the capacitive sensor is positioned between the first layer and the second layer of the composite panel.

11. The system of claim 9, wherein the passenger input receiver comprises a passenger mobile device communicatively coupled with the system control module to communicate input provided by the passenger via the passenger mobile device to the heater control module.

12. The system of claim 9, wherein the system control module is configured to:

determine whether a temperature condition threshold has been reached; and prevent the heater control module from varying the voltage to the resistance heater in response to input provided by the passenger via the passenger input receiver when the system control module determines the temperature condition threshold has been reached.

13. The system of claim 7, wherein the heater control module is configured to monitor a health condition of the resistance heater and communicate the health condition to the system control module.

14. A method of making a composite panel, comprising:
providing a first electrically non-conductive layer, wherein the first electrically non-conductive layer is flexible;
applying a flexible heater control module onto the first electrically non-conductive layer;
applying a capacitive sensor onto the first electrically non-conductive layer;
printing a resistance heater onto the first electrically non-conductive layer; and
applying a second electrically non-conductive layer onto the heater control module, capacitive sensor, and resistance heater to form the composite panel.

15. The method of claim 14, wherein printing the resistance heater onto the first electrically non-conductive layer comprises:

printing an electrically conductive layer onto the first electrically non-conductive layer using a conductive ink; and printing a heater layer onto the electrically conductive layer using a switching-type positive temperature coefficient ink.

16. The method of claim 15, wherein applying the capacitive sensor onto the first electrically non-conductive layer comprises printing the capacitive sensor onto the first electrically non-conductive layer.

17. The method of claim 16, wherein printing the capacitive sensor and the resistance heater onto the first electrically non-conductive layer comprises at least one of screen printing, inkjet printing, rotary screen printing, gravure printing, and atomized jetted depositing the capacitive sensor and the resistance heater onto the first electrically non-conductive layer.

18. The method of claim 14, wherein applying the heater control module onto the first electrically non-conductive layer comprises printing the heater control module onto the first electrically non-conductive layer.

19. The method of claim 14, further comprising shaping the composite panel into a non-planar shape.

20. The method of claim 19, further comprising at least one of hardening and curing the composite panel in the non-planar shape.

* * * * *